(12) United States Patent
van Os

(10) Patent No.: US 7,617,985 B2
(45) Date of Patent: Nov. 17, 2009

(54) COMBINATION DOCUMENT AND CARD READER SCANNER

(75) Inventor: Ron van Os, Morrison, CO (US)

(73) Assignee: Visioneer, Inc., Pleasanton, CA (US)

( * ) Notice: Subject to any disclaimer, the term of this patent is extended or adjusted under 35 U.S.C. 154(b) by 67 days.

(21) Appl. No.: 11/266,127

(22) Filed: Nov. 2, 2005

(65) Prior Publication Data

US 2007/0095917 A1 May 3, 2007

(51) Int. Cl.
*G06K 13/00* (2006.01)
*G06K 13/06* (2006.01)

(52) U.S. Cl. .................. 235/475; 235/483; 235/484; 235/485

(58) Field of Classification Search .......... 235/475, 235/454, 375, 482–485
See application file for complete search history.

(56) References Cited

U.S. PATENT DOCUMENTS 4,098,458 A * 7/1978 Auchinleck ................. 235/475
7,204,408 B2 * 4/2007 Cato ......................... 235/375
2002/0196479 A1 * 12/2002 Simske ...................... 358/474
2005/0127182 A1 * 6/2005 Nagata et al. ............... 235/454

* cited by examiner

*Primary Examiner*—Thien M. Le
*Assistant Examiner*—April A Taylor

(57) ABSTRACT

The invention claimed is a method and apparatus to allow for scanning of both paper documents and thicker media such as credit or identification cards utilizing the same piece of scanner hardware. The inventive apparatus provides a depressible card reader slot located in the center of the horizontal axis of the sheet feed, and accompanying cantilever system for providing appropriate thickness of insert area for the particular media. A software implementation facilitates an automatic scan of either media inserted. The inventive method and apparatus is unique to the prior art in that it allows both media types to be scanned utilizing the same piece of hardware, and wherein scanning occurs automatically, which offers both ease of use and value to the consumer.

10 Claims, 5 Drawing Sheets

COMBINATION DOCUMENT AND CARD READER SCANNER

FIELD

The invention relates to digital document scanners, and more particularly to a combination document and card scanner wherein alternately a paper document may be scanned, and also a card as in a credit card or an identification type card utilizing the same piece of hardware, wherein the scan is initiated by placement of a document or card alone.

BACKGROUND OF THE INVENTION

The invention most closely corresponds with USPTO Class 358, wherein the invention involves the communication or reproduction of a static image or sequence of static images in which the density variations composing the image do not vary with time (e.g., a document image) by a method or apparatus.

In its simplest form, the invention comprises an improved document scanner wherein both a paper document can be automatically scanned and a credit card or identification type card may be scanned utilizing the same hardware.

With current traditional document scanners, some offer only the option of scanning paper documents. Conversely, there are card reader type scanners, however the emphasis on this art resides wherein business cards are scanned into some form of a user's database to create a contact record from the card. At present, there are no single scanners which scan documents, credit cards, and business cards automatically, e.g. wherein the scan is initiated by the insertion of media alone, and wherein an application is launched on the user's computer as a result of the automatic scan. Specific to the present invention, the card types are not limited to credit cards, but encompass business card type forms as well.

THE INVENTION

Summary, Objects and Advantages

Traditional document scanners come in the form of hand held units, flatbed scanners, or ADF (automatic document feeder) type systems. These current art scanners primarily scan only paper documents. Analogous to these scanners there are business card scanners which scan a card and transfer the data to a user's computer purportedly to create a contact database. As technology advances, so too does the use of identification type cards similar in construction to credit cards. Such cards may be medical identification cards wherein a physician's office or hospital requires the patient to proved the cards upon admission or office visits. Identification cards have a myriad of uses in today's business world, but for the sake of clarity, this Application will use medical identification cards as an exemplar.

Speed of operation, ease of use, and value for the dollar are all aspects of a company's decision to purchase office equipment. Presently, scanners are an integral part of most business operations. The present invention seeks to provide a solution wherein a medical office, for example, may have a document scanner with additional card scanning capability to enable both document scanning and card scanning. The office can scan a completed paper form from a patient or customer, and scan their identification card utilizing the same piece of hardware. Such a system offers the aforementioned speed, ease of use, and value for the dollar.

The Assignee on this Application presently owns a patent encompassing a method it markets as "auto-launch", U.S. Pat. No. 5,499,108. This patent is relevant to the present Application in that it provides a significant improvement wherein the auto-launch feature may be utilized in the embodiments of the inventive apparatus to be outlined herein. The definition of auto-launch is an automatic scan of a medium upon mere insertion of the medium into a scanner, and subsequent launching of an application resident in the user's computer. Assignee Visioneer, Inc. also markets a line of small scanners wherein the product line is marketed as the "Strobe" with various models included in the line. U.S. Pat. No. 5,517,332. The Strobe scanner is a small single sheet fed scanner approximately 11 inches wide by 4 inches deep and 2 inches high. The Strobe scanners contain a paper slot whereby a single sheet may be fed into the scanner and an automatic scan may occur.

In the case of a Strobe type scanner, presently Visioneer, Inc. produces the single sheet, single slot scanner. The present invention provides for a modified Strobe type scanner wherein the paper feed construction is altered to accommodate credit card type media as well as paper documents. The present paper feed consists of a horizontal slot within the scanner housing containing paper guides and paper sensors. The present invention modifies the paper feed capability to encompass a credit card type media by introducing mechanics that allow compensation for the thickness of the media to be inserted and assured drawing of the media through the scanner.

The inventive method includes software implementation such as that described in Assignee's '108 patent. In brief, the paper sensors serve as notification that the scanner has received a document. In turn, the auto-launch feature is evidenced by the automatic drawing of the document through the scanner and an automatic launch of an application on the user's computer. Modification of the program code of the "auto-launch" process to facilitate the inventive method provides for automatic switching between a paper scan mode and a card scan mode for the thicker media. Thus, when the scanner has received a credit card type media, the paper sensors alert the software that a card is present as opposed to a document. Subsequently the user may have options available for a card scan or paper scan accordingly. Such options maybe pre-set by a user to occur automatically as in auto-launch, or a user may manually input parameters.

Alternate embodiments of the inventive method may be obvious, in view of an ADF model scanner, as an example, wherein the paper reception could be modified to accept a credit card type media as well as a paper document. This application should be reasonably interpreted to cover such an apparatus as being an obvious derivative of the embodiment detailed herein. Further, the inventive method may be applied to both duplex and simplex scanning methods and is not limited to one or the other.

BRIEF DESCRIPTION OF THE DRAWINGS

The invention is described in further detail by reference to the drawings in which.

DETAILED DESCRIPTION, INCLUDING BEST MODES OF CARRYING OUT THE INVENTION

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in five relatively simple figures; although sufficiently complex as to illuminate to one skilled in the art of such scanner architecture, and calibration methods viable for making or using said invention.

Figure 1:
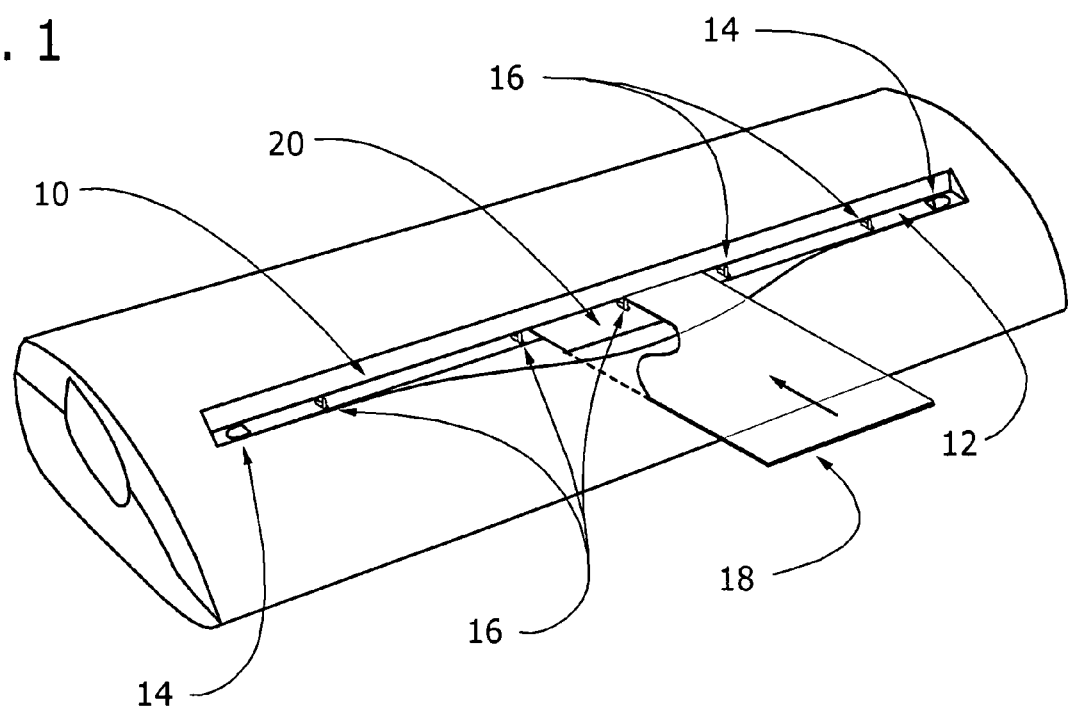
FIG. 1 is an illustration of the inventive apparatus indicating the scanner, paper feed, and card slot entry section.

FIG. 1 illustrates the inventive apparatus as encased in the scanner housing. Horizontally across the front end of the scanner is the paper entry 10. The paper tray 12 which is a small lip section at the base of the paper insert incorporates the paper guides 14 as well as the card and paper sensors 16. The primary external materials comprise plastic parts.

Further to FIG. 1, the card reader insert portion of the scanner is illustrated by example of a card media as protruding from the center of the paper entry 18. The center paper sensor serves to act as a sensor for the card 20 and hereinafter is referred to as the card reader slot and card sensor respectively.

Figure 2:
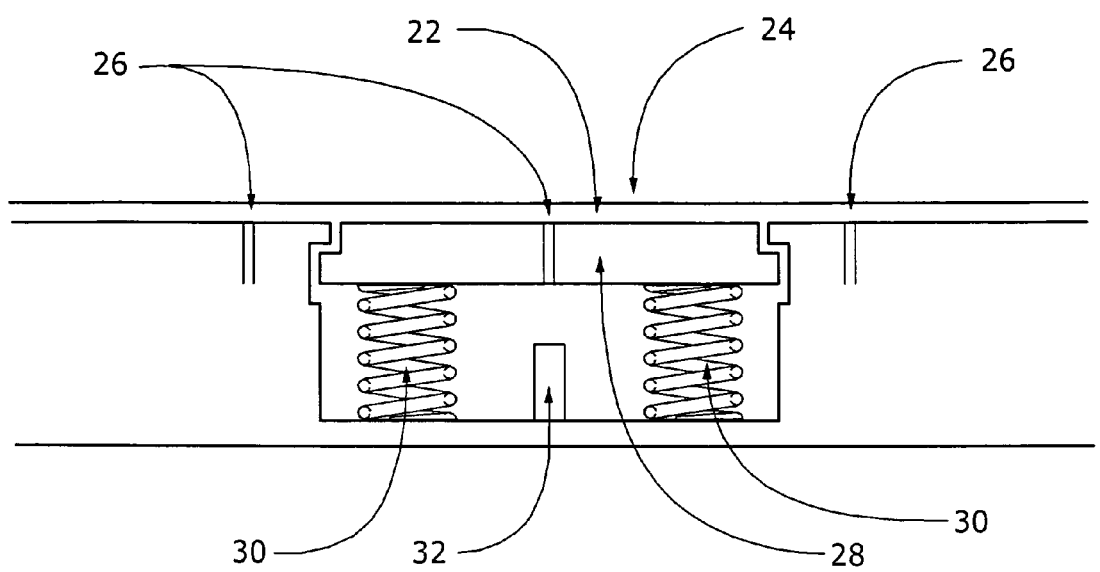
FIG. 2 is a cross section view of the card insert mechanics without a card present.

FIG. 2 is a cross section front view of the inventive apparatus without the presence of a card in the card reader slot. The document paper entry is shown 22 with the center section card insert illustrated as a break in the line 24. The paper sensors are located at intervals along the paper tray 26. Two platforms form the base for the card tray or slot 28, and are attached to springs which will allow depression based upon the thickness of an inserted card 30. A detector is connected at the base of said springs to alert the scanner that a card has been inserted and needs to be drawn through the scanner 32. The depressible card tray allows self-alignment of the card by providing side support guides when depressed. The paper sensors 26 detect the presence of a media as inserted to be scanned. The detector 32 determines if the media is paper or a card based upon the pressure detected.

Figure 3:
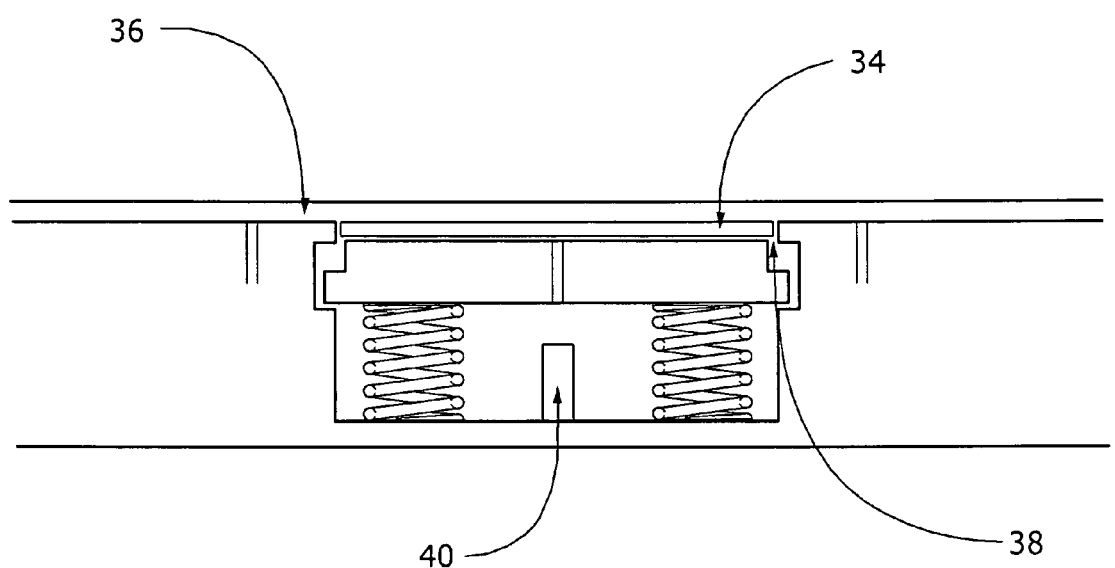
FIG. 3 is a cross section view of the card insert mechanics with a card present.

FIG. 3 is a cross section front view of the inventive apparatus showing the presence of a card in the card slot 34. Again, the paper entry is illustrated 36. Card alignment guides are located on either edge of card slot to insure proper skew of the card as it is drawn into the scanner 38. As with FIG. 2, the detector is illustrated as located at the bottom of the spring mechanism 40. FIG. 3 shows the springs depressed with the card platform lowered in relation to the thickness of the present card.

Figure 4:
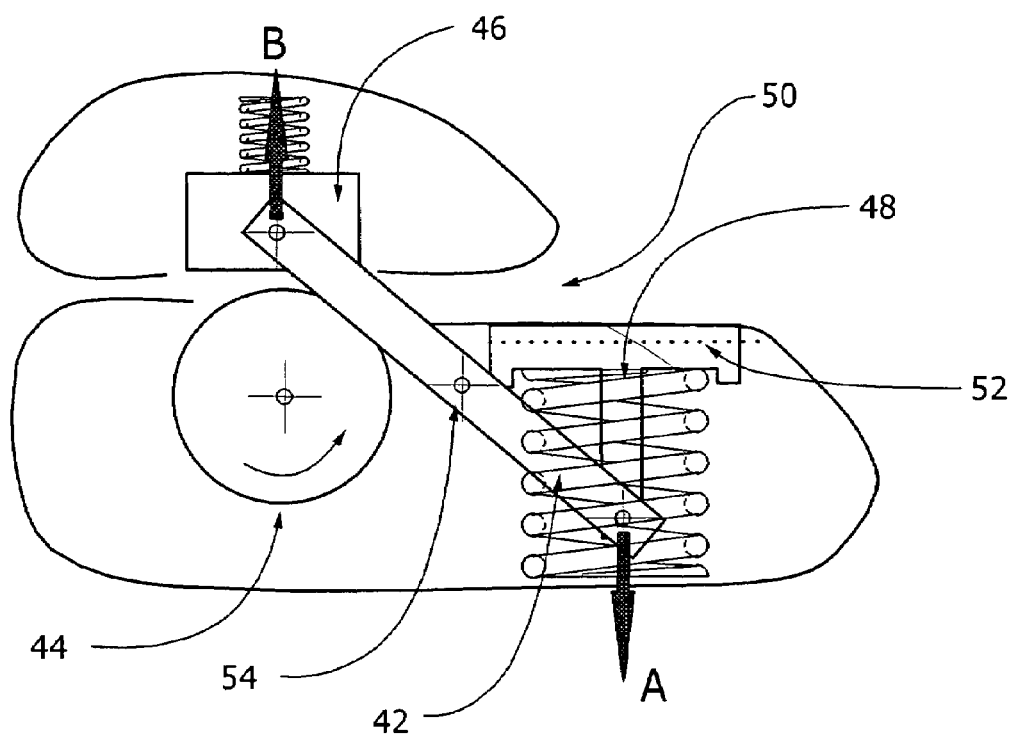
FIG. 4 is a cross section view of the inventive apparatus shown from the side with the mechanics engaged and card present.

FIG. 4 is a cross section side view of the card slot mechanics at each end of the scanner. When a card is present, and said spring and platform mechanisms are depressed to allow acceptance of the card, a central cantilever 42 is caused to be lifted away from the scanner's roller 44 by the card insert unit 46. The downward pressure "A" is exerted by the insertion of the card and is translated in an upward force "B" around the center point of the cantilever. The proper ratio can be set by moving the cantilever counter points 54 closer to either attachment points (A or B). Said movement forms a track for the card to insure positive pickup and travel by the roller. The depression of the card reader tray 48 causes a gap between the roller and CIS to increase in order to facilitate sure pickup of the thicker media into the scanner's paper feed mechanism 50. In response to pressure from the card tray unit, the cantilever design allows for increasing said gap proportionate to the media thickness.

Further to FIG. 4, upon depression of the card tray mechanism, a media guide is naturally formed by either side of the scanner housing when the card tray is depressed as provided by the walls of the scanner housing formed as depression occurs 52.

Figure 5:
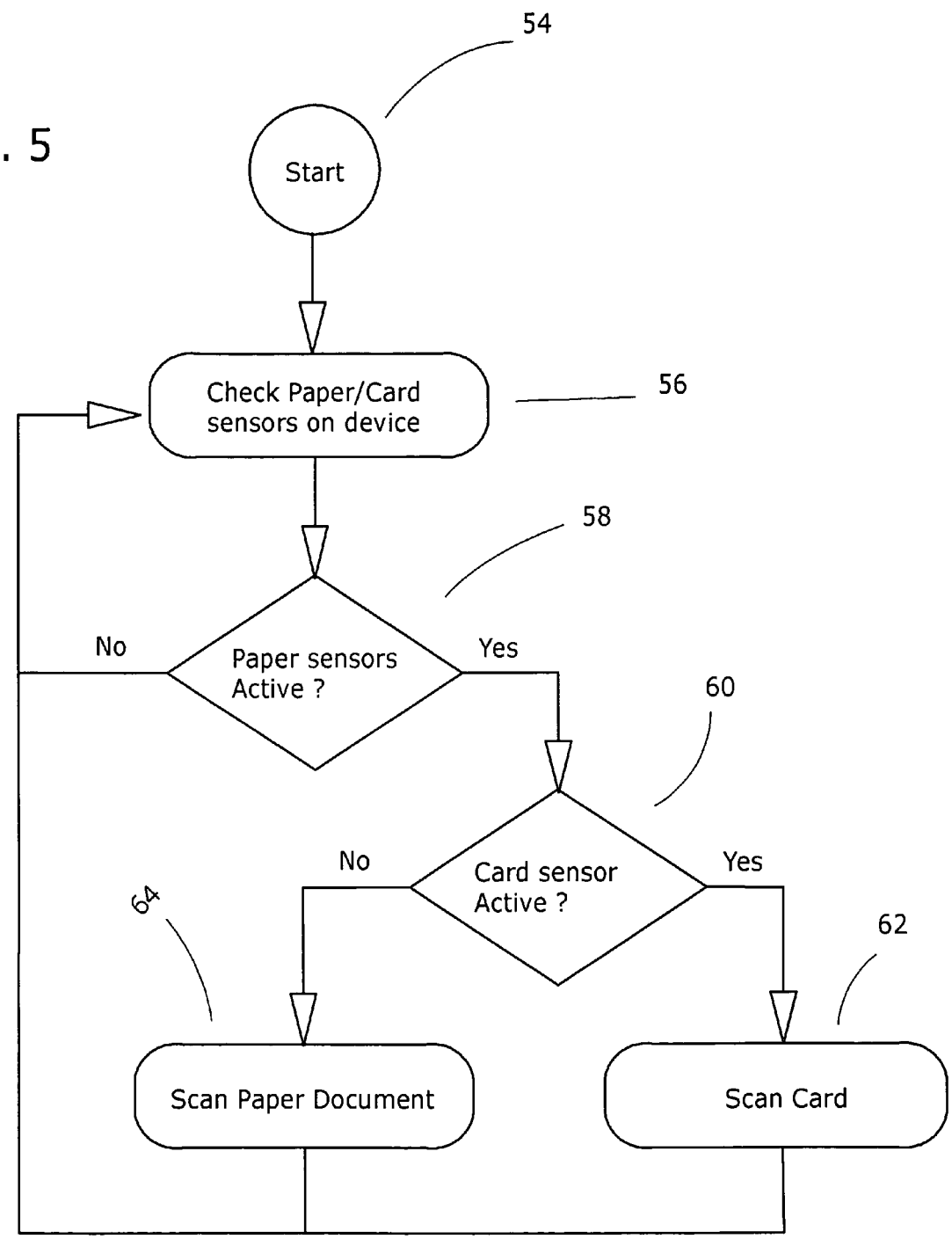
FIG. 5 is a flowchart of the software implementation in either case of media inserted.

FIG. 5 is a simple flowchart of the inventive software process as performed by insertion of either a paper document or card into the scanner. A start point 54 represents insertion of a document or card. The paper and/or card sensors on the scanner report to the software the type of media inserted 56. If paper sensors are active 58 the process checks whether the card sensor is active 60. In the case of activated card sensors, the scan occurs by drawing the card into the scanner 62 and completing the scan in accordance with parameters of the software as preconfigured by the user or by auto-launch. Where the card sensor has not been activated, the software determines the scan is a paper document and proceeds with the relevant scan 64 as similar to the card scan aforementioned.

The invention claimed is:

1. An improved apparatus for digitally scanning either a paper document or a thicker media including a credit card, wherein the improvement comprises:
   a) means for a single apparatus to receive both paper documents and credit card media;
   b) means for insuring throughput of both the paper documents and credit card media;
   c) means for automatic scanning of inserted media wherein placement alone is sufficient to initiate scan; and
   d) means for automatically switching between both card scan and paper scan modes via software implementation.

2. The apparatus as in claim 1 wherein the mechanism to receive paper documents comprises a horizontal sheet feed with an adjustable card slot located in the center of said sheet feed.

3. The apparatus as in claim 2 wherein said adjustable card slot comprises a depressible plastic paper tray section as a portion of the bottom of said horizontal sheet feed for receipt of a credit card type media.

4. The apparatus as in claim 3 wherein the adjustable card slot is depressible partially as a result of springs located beneath said depressible plastic tray.

5. The apparatus as in claim 4 wherein a cantilever mechanism is incorporated to facilitate creation of a gap proportionate to the thickness of the media inserted into said sheet feed, and wherein said cantilever moves accordingly to insure proper pickup against the scanner's roller.

6. The apparatus as in claim 5 wherein upon insertion of a media to be scanned, the cantilever mechanism adjusts to allow only the media's thickness to initiate the space of said gap in the sheet feed.

7. The apparatus as in claim 1 wherein the means for insuring throughput is assisted by guides formed on each side of a depressed card slot when the card tray has been depressed formed by the inside walls of a card slot.

8. The apparatus as in claim 1 wherein the means for said single apparatus to receive a paper document or a thicker media begins with detection of the media inserted.

9. The apparatus as in claim 8 wherein said detection comprises paper sensors located along a horizontal axis of a sheet feed and specific card sensors located within a section reserved for a card or thicker media to be inserted into a card slot.

10. The apparatus as in claim 9 wherein said paper sensors detect whether a paper document or a thicker media has been inserted into the sheet feed as dependant upon thickness of the media and at what location the media has been inserted along the horizontal axis of the sheet feed.

* * * * *